United States Patent [19]

Campbell et al.

[11] 4,283,504
[45] Aug. 11, 1981

[54] CROSSLINKABLE POLYMERS CONTAINING ACRYLAMIDOPHENOL UNITS

[75] Inventors: Gerald A. Campbell, Webster; Kenneth R. Hollister, Pittsford; Richard C. Sutton, Rochester, all of N.Y.

[73] Assignee: Eastman Kodak Company, Rochester, N.Y.

[21] Appl. No.: 83,742

[22] Filed: Oct. 11, 1979

Related U.S. Application Data

[62] Division of Ser. No. 893,557, Apr. 4, 1978, Pat. No. 4,207,109.

[51] Int. Cl.³ .................. C08F 22/38; C08F 122/38; C08F 212/04; C08F 220/58
[52] U.S. Cl. .................................. 525/261; 260/8; 260/117; 428/411; 430/536; 525/336; 526/323
[58] Field of Search ............... 526/323; 428/411; 525/261, 336

[56] References Cited

U.S. PATENT DOCUMENTS 3,758,445  9/1973  Cohen et al. ...................... 526/23
3,904,418  9/1975  Mowrey et al. .................... 96/73

FOREIGN PATENT DOCUMENTS 51-48624  4/1976  Japan .
318201  2/1957  Switzerland .
1407670  9/1975  United Kingdom .

*Primary Examiner*—Howard E. Schain
*Attorney, Agent, or Firm*—John R. Everett

[57] ABSTRACT

Copolymers containing an acrylamidophenol as a crosslinking site and the corresponding crosslinked polymers are disclosed. The acrylamidophenol unit can be copolymerized with a wide variety of other monomers to provide crosslinkable and crosslinked polymers with useful properties. The acrylamidophenol unit provides for crosslinking at low pH with conventional crosslinking agents. The acrylamidophenol monomer unit is present in the copolymer from about 0.5 to 50 percent by weight and has the formula:

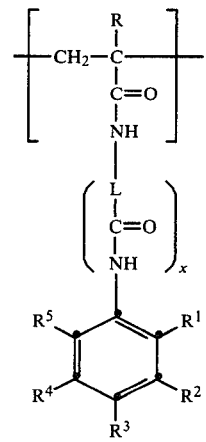

wherein:
 x is 1 or 0,
 L is a linking group,
 R represents hydrogen or methyl, and
 $R^1$ through $R^5$ are independently selected from the group consisting of hydrogen, hydroxy, alkyl from 1 to 6 carbon atoms and aryl from 6 to 10 carbon atoms; with the proviso that at least one of $R^1$ through $R^5$ is hydroxy and at least one of the positions ortho or para to said hydroxy has a hydrogen atom attached thereto. The remainder of the polymer can comprise from 50 to 99.5 percent by weight of at least one additional polymerized ethylenically unsaturated monomer. Elements, particularly photographic elements, comprising a support having coated thereon either the crosslinked or uncrosslinked polymer are also disclosed.

10 Claims, No Drawings

CROSSLINKABLE POLYMERS CONTAINING ACRYLAMIDOPHENOL UNITS

This is a division of application Ser. No. 893,557, filed Apr. 4, 1978, now U.S. Pat. No. 4,207,109, issued June 10, 1980.

BACKGROUND OF THE INVENTION

1. Field of the Invention

This invention relates to polymeric materials. More particularly, it relates to a polymeric material which is crosslinked at low pH with conventional gelatin crosslinking agents. The crosslinked polymers of the present invention can be coated on various supports to provide useful elements, particularly photographic elements.

2. Description of the Prior Art

It is well known that certain units can be included in a copolymer to provide for the later crosslinking of the polymer. Typically, conventional units which provide for the crosslinking of the polymer have had activated methylene groups, amine groups or hydroxyl groups. Unfortunately, known units of these types do not provide for crosslinking at low pH. Because of this deficiency, a large number of copolymers cannot be crosslinked using conventional crosslinking units. For example, polymers of acid comonomers containing conventional crosslinking groups must be neutralized before they can be crosslinked.

Frequently, it is desirable to disperse various components which are sensitive to pH in crosslinkable polymers. Thus, in addition to the fact that the polymer itself might hydrolyze at high pH (about 5 or higher), a component that is dispersed in the polymer might also be affected if the polymer dispersion was crosslinked at high pH. For example, photographic silver halide is usually coated in a polymeric binder and is optimally coated in the range of pH 4.5 to 6.5. The higher pH that is sometimes necessary to initiate crosslinking with conventional crosslinking units can adversely affect the silver halide. In addition to silver halide, other pH sensitive components can be coated in polymeric binders to form, for example, useful integral bio-analytical elements. Typical integral analytical elements are described, for example, in U.S. Pat. No. 3,992,158 to Pryzbylowicz and Millikan and the reference cited therein.

Typically, the active methylene group of a crosslinkable polymer is located in a side chain and is linked to the main chain of the polymer through an ester group. In one patent relating to active methylene group-containing polymers, namely, U.S. Pat. No. 3,904,418, crosslinked polymers which are particularly resistant to hydrolysis are described. The patent does discuss the disadvantages of hydrolysis of crosslinked polymers at high pH; however, since the crosslinking reaction itself must be carried out at pH values above about 5, hydrolysis of other components included with the polymer can occur.

One area where conventional crosslinking polymers are extremely useful is as extenders for gelatin in photographic elements. Due to its unique properties, including its ability to disperse silver halide and its excellent protective colloid properties, gelatin has been used as a binding agent in layers of photographic elements for many years. Gelatin is, however, vulnerable to dimensional change when subjected to varying conditions, such as temperature and humidity. Gelatin can also hydrolyze to amino acid fragments when subjected to extremely acidic or basic conditions. Crosslinking polymers have been proposed as substitutes or partial substitutes for gelatin in one or more layers of photographic elements to improve dimensional stability. As mentioned above, however, conventional crosslinking polymers must be crosslinked with care when used with silver halide emulsions, due to the fact that the silver halide is sensitive to pH. Some silver halide emulsions cannot be directly used with these conventional crosslinking polymers. This complicates, and therefore makes more expensive, the photographic film manufacturing process.

It is readily apparent that there is a continuing need for crosslinkable polymers which can be crosslinked with conventional gelatin hardening agents at relatively low pH.

SUMMARY OF THE INVENTION

We have found that a particular addition copolymer can be crosslinked with conventional gelatin crosslinking agents over a wide pH range. The copolymer is an acrylamidophenol comprising:

A. from about 0.5 to 50 percent by weight of a unit having the formula:

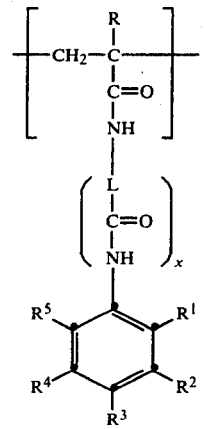

wherein:

x is 1 or 0,

R represents hydrogen or methyl,

L is a linking group such as alkylene and cycloalkylene having from 1 to 6 carbon atoms or arylene having from 6 to 10 carbon atoms, and $R^1$ through $R^5$ are independently selected from the group consisting of hydrogen, hydroxy, alkyl from 1 to 6 carbon atoms such as methyl, ethyl, isopropyl, butyl, hexyl and the like and aryl from 6 to 10 carbon atoms such as phenyl, naphthyl and the like, with the proviso that at least one of $R^1$ through $R^5$ is hydroxy and at least one of the positions ortho or para to said hydroxy has a hydrogen atom attached thereto; and B. from about 50 to 99.5 percent by weight of units of at least one additional polymerized ethylenically unsaturated monomer. Particularly preferred polymers according to the present invention are those wherein the acrylamidophenol has the hydroxy of the phenol in the meta position. The copolymers described above can be crosslinked at a pH as low as 1.0. Polymers according to the present invention can take a wide variety of forms, and the crosslinking unit described above can be used with numerous polymeric units which could otherwise not be crosslinked. Thus, in another aspect of the present invention, there is provided a crosslinked polymer comprising the addition copolymer described above which has been crosslinked with 0.1 to 25 percent by weight based on the total weight of the uncrosslinked polymer with a crosslinking agent. Preferably, the crosslinking agent is an aldehyde or an organic compound having at least two activated double bonds.

It is noted here that throughout the specification and claims the terms "alkyl" and "aryl" include alkyl and aryl substituted with a variety of substituents which have no effect on the crosslinking properties of the polymer, including halo (such as chloro and bromo), nitro, cyano, oxo and the like.

Portion B of the addition copolymers described above can provide a wide variety of useful properties to a coating composition. For example, portion B can be an antistatic unit, a dye mordanting unit, an acid buffering unit and the like. Thus, in another aspect of the present invention, there is described an element comprising a support having coated thereon either the uncrosslinked or crosslinked addition copolymer described above.

The acrylamidophenol crosslinking unit described above is compatible with gelatin. By compatible, it is meant that when certain polymers containing the unit are mixed with gelatin, a substantially clear mixture results. Thus, in another aspect of the present invention, there is provided a photographic element comprising a support having coated thereon at least one photographic silver halide emulsion layer with or without gelatin and, either in the same or adjacent layer, the crosslinked or uncrosslinked addition copolymer described above. In preferred embodiments, the addition copolymer described above is in the same layer as the photographic silver halide.

DETAILED DESCRIPTION OF THE INVENTION

The acrylamidophenol monomers that are used to make the polymers of the present invention can easily be made by one of ordinary skill in the art. One convenient method is to form a suspension of the selected aminophenol and add it dropwise to a solution of acrylic or methacrylic anhydride. The reaction mixture is then stirred until the reaction is complete and the product precipitated by pouring the reaction mixture onto ice. Exemplary monomers prepared in this manner include:

N-(3-hydroxyphenyl)methacrylamide
N-(4-hydroxyphenol)methacrylamide
N-(3-hydroxyphenyl)acrylamide
N-(4-hydroxyphenyl)acrylamide The polymers according to the present invention are made using the acrylamidophenol monomer by techniques which are well known to those skilled in the art. Typically, the polymers are made by simply dissolving the acrylamidophenol monomer and the other ethylenically unsaturated monomer in a suitable solvent in the presence of catalyst. The temperature at which the polymers described herein are prepared is subject to wide variation, since this temperature depends upon such variable features as the specific monomer used, duration of heating, pressure employed and like considerations. However, the polymerization temperature generally does not exceed about 110° C., and most often it is in the range of about 50 to about 100° C. The pressure employed in the polymerization is usually only sufficient to maintain the reaction mixture is liquid form, although either superatmospheric or subatmospheric pressures can be used where such is advantageous. The concentration of polymerizable monomers in the polymerization mixture can be varied widely with concentrations up to about 100 percent by weight, and preferably from about 20 to about 70 percent by weight, based on the weight of the polymerization mixture being satisfactory. Suitable catalysts for the polymerization reaction include, for example, the free radical catalysts, such as hydrogen peroxide, cumene hydroperoxide, water-soluble azo-type initiators and the like. In redox polymerization systems, conventional ingredients can be employed. If desired, the polymer can be isolated from the reaction vehicle by freezing, salting out, precipitation or any other procedure suitable for this purpose.

The acrylamidophenol monomer can be copolymerized with 50 to 99.5 percent by weight of a large variety of other ethylenically unsaturated monomers. The acrylamidophenol monomer can be copolymerized with monomers which would be unstable at high pH, such as cyanomethyl methacrylate, phenol acrylate and vinylbenzyl chloride. Thus, the range of useful comonomers is extremely wide. Exemplary monomers include: vinyl esters, amides, nitriles, ketones, halides, ethers, alpha-beta unsaturated acids or esters thereof, olefins, diolefins and the like, as exemplified by acrylonitrile, methacrylonitrile, styrene, alpha-methyl styrene, acrylamide, methacrylamide, vinyl chloride, methyl vinyl ketone, fumaric, maleic and itaconic esters, 2-chloroethyl vinyl ether, acrylic acid, sodium methacryloyloxyethyl sulfate, methacrylic acid, dimethylaminoethyl methacrylate, sodium 2-acrylamido-2-methylpropane-1-sulfonate, 2-hydroxyethyl methacrylate, 4,4,9-trimethyl-8-oxo-7-oxa-4-azonia-9-decene-1-sulfonate, N-vinylsuccinamide, N,N-dimethyl-N-2-hydroxypropylamine methacrylimide, N-vinylphthalimide, 1-vinyl-2-pyrrolidinone, butadiene, isoprene, vinylidene chloride, ethylene and the like. Sulfoacrylate salts are particularly useful as comonomers in the practice of this invention. For example, sodium 3-methacryloyloxypropane-1-sulfonate, sodium 3-acryloyloxypropane-1-sulfonate and others, as described in Dykstra, U.S. Pat. No. 3,411,911, issued Nov. 19, 1968, are particularly useful.

The acrylamidophenol unit can be incorporated primarily to provide for the crosslinking of the polymer. The other comonomer may provide other desirable properties and functions. For example, where the other ethylenically unsaturated comonomer is a quaternary ammonium salt or other charged group, the crosslinkable or uncrosslinked polymer can form an antistatic polymer which is useful in antistatic layers on fibers and other elements such as photographic elements and the like. Where the other ethylenically unsaturated comonomer contains a color coupler group such as active methylene, phenolic and pyrazolone groups, the copolymer can provide for the formation of a colored image by reaction of the color coupler group with oxidized developer. The other ethylenically unsaturated comonomer can also provide a mordanting function, with the acrylamidophenol being present only in sufficient amount to crosslink the mordant. In another useful embodiment, the copolymers of the present invention can be used in acid buffering layers. The other ethylenically unsaturated comonomer can include groups which hydrolyze at high pH. These copolymers can be formed and coated at low pH and, when subsequently subjected to a high pH environment, provide a buffering action through hydrolysis. It will be readily appreciated that copolymers containing conventional crosslinkable groups which must be crosslinked at high pH would be less suited to these embodiments.

As mentioned previously, the acrylamidophenol unit is present in the polymer typically in an amount that is sufficient to crosslink the polymer. At excessively high proportions of the crosslinking acrylamidophenol, the desirable properties of the other ethylenically unsaturated monomer are diluted. Conversely, at excessively low proportions or crosslinking acrylamidophenol, there are insufficient crosslinking sites to adequately crosslink the polymer. A useful crosslinking range is from about 0.5 to about 50 percent by weight of the acrylamidophenol unit, based on the total amount of copolymer. A preferred range is between about 1 percent and about 20 percent by weight of the acrylamidophenol crosslinking monomer.

Copolymers containing the acrylamidophenol crosslinking site described above can be crosslinked with any of an extremely wide variety of crosslinking agents. The useful crosslinking agents include those which are generally known to crosslink gelatin. Particularly preferred crosslinking agents include aldehydes and organic compounds having at least two activated double bonds. Useful crosslinking agents for the polymers of the present invention include aldehydes such as formaldehyde, succinaldehyde, glutaraldehyde and alpha-methyl glutaraldehyde. Activated double-bond crosslinking agents include vinylsulfone methanes, triazines such as triallyl cyanurate and N,N-diallyl-melamine, and bis(vinylsulfonyl) compounds such as those disclosed in U.S. Pat. Nos. 3,490,911; 3,539,644 and 3,841,872.

To crosslink the copolymers containing the acrylamidophenol crosslinking unit of the present invention, the crosslinking agent is simply added to the solution of the polymer at room temperature. Crosslinking of the polymer will take place at a pH of the polymer solution as low as 1.0. Generally, the amount of crosslinking agent that is used depends upon the proportion of the acrylamidophenol crosslinking site in the interpolymer. Typically, the crosslinking agent is used in an amount between about 0.1 to about 10 percent by weight of the copolymer. Of course, the lower end of the useful range of the amount of crosslinking agent would be most useful with the lower end of the range of acrylamidophenol crosslinking unit. The optimum amount can easily be determined by one of ordinary skill in the art.

Exemplary polymers of the present invention include:

poly(methyl methacrylate-co-m-methacrylamidophenol) 80:20 poly(acrylamide-co-1 vinylimidazole-co-m-methacrylamidophenol) 90:5:5 poly[2-acrylamido-2-methylpropane-1-sulfonic acid, sodium salt-co-4'-chloro-3'-[α-4(4-methoxycarbonylphenoxy)-α-pivaloylacetamido]acrylanilide-co-m-methacrylamidophenol] 50:45:5 poly[2-acrylamido-2-methylpropane-1-sulfonic acid, sodium salt-co-1-(2,4,6-trichlorophenyl)-3-(3-acrylamidobenzamido)-2-pyrazoline-5-one-co-m-acrylamidophenol] 48:47:5 poly[2-acrylamido-2-methylpropane-1-sulfonic acid, sodium salt-co-1-(2,4,6-trichlorophenyl)-3-(3-acrylamidobenzamide)-2-pyrazoline-5-one-co-p-methacrylamidophenol] 51:45:5 poly[2-acrylamido-2-methylpropane-1-sulfonic acid, sodium salt-co-1-(2,4,6-trichlorophenyl)-3-(3-acrylamidobenzamido)-2-pyrazoline-5-one-co-p-acrylamidophenol] 48:47:5 poly(acrylic acid-co-m-methacrylamidophenol) 95:5, and poly(methacrylic acid-co-m-methacrylamidophenol) 95:5

The elements of the present invention may have a wide variety of uses, depending upon the properties of the specific copolymer that is coated on the support. For example, where the acrylamidophenol crosslinking unit is used with an antistatic monomer, the resulting copolymer can be coated on fibers, cloth webs, photographic supports and the like to provide useful static-resistant elements. Where the acrylamidophenol crosslinking unit is included with a dye mordant monomer, the resulting copolymer can be coated on a suitable support and the element used as a dye receiver in a diffusion transfer photographic process. Where the other ethylenically unsaturated monomer is ionizable at a particular pH, the copolymer can serve as a pH buffer. Layers of the polymers of the present invention can, therefore, be used in a wide number of environments requiring such a buffer. For example, photographic elements, typically diffusion transfer elements, require a specific pH for optimum performance, and these polymers could be used as neutralizing layers in image transfer units. Similarly, many bio-analytical elements require a specific pH environment.

Depending upon the specific use of the element, the copolymer of the present invention can be coated on a wide variety of supports. For example, the copolymers can be coated on a wide variety of fibers, such as polyester fibers and the like. The copolymers of the present invention may also be coated on conventional photographic supports, such as poly(ethylene terephthalate), cellulose acetate butyrate, polycarbonate, polyolefins and the like. The support can be an opaque support, such as paper, or polyolefin-coated paper, such as polyethylene- or polypropylene-coated paper, which can be pigmented with $TiO_2$, for example, and electron bombarded to promote emulsion adhesion.

The support has a layer thereon which contains either the crosslinked or uncrosslinked polymer of the present invention. Supports with a layer thereon containing the uncrosslinked copolymer are useful, for example, where it is desirable to harden, i.e., crosslink the layer at some time after manufacture. In silver halide elements, for example, it is sometimes desirable to coat the silver halide emulsion in a not fully hardened binder, so as to facilitate penetration of the layer by processing solutions. The silver halide emulsion layer can then be hardened in a process step after development, thereby providing desirable properties to the processed element. The uncrosslinked copolymer of the invention can be crosslinked in situ on the element by simply exposing the element to the crosslinking agent such as by immersing the element in a solution of the agent. It is preferred, however, that the copolymers of the present invention be mixed with the crosslinking agent before coating.

The polymers of the present invention are particularly useful in photographic elements where they can be used to perform a variety of functions, such as antistatic layers, acid buffering layers and the like, as described above. The polymers can be used in a variety of photographic elements, such as silver halide, diazo, diffusion transfer, vesicular, photothermographic and like elements. Since the acrylamidophenol unit is compatible with gelatin, the polymers of the present invention are particularly useful with silver halide elements with a gelatin binder. The silver halide employed in the preparation of lightsensitive coatings and elements described herein includes any of the photographic silver halide as exemplified by silver bromide, silver chloride, and silver iodide, or mixed silver halides such as silver chlorobromide, silver bromoiodide and the like. Very good results are obtained with high-contrast silver halide emulsions in which the halide comprises at least 50 mole percent chloride. Preferred emulsions of this type contain at least 60 mole percent chloride; less than 40 mole percent bromide and less than 5 mole percent iodide. The polymers can be used in various kinds of photographic emulsions. For example, they can be used in direct positive silver halide emulsions, x-ray and other non-spectrally sensitized emulsions, as well as in orthochromatic, panchromatic and infrared sensitive emulsions, particularly those sensitized with merocyanine dyes, cyanine dyes, carbocyanine dyes and the like. Furthermore, these polymers can be used in emulsions intended for color-forming couplers or emulsions to be developed by solutions containing couplers or other color-generating materials. In addition, these polymers can be used in photographic emulsions containing developers, e.g., polyhydroxybenzenes, as well as in emulsions intended for use in diffusion transfer processes which use the non-developed silver halide in the non-image areas of the negative to form a positive by dissolving the under-developed silver halide and precipitating it on a receiving layer in close proximity to the original silver halide emulsion layer. Such processes are described in Rott, U.S. Pat. No. 2,352,014; Land, U.S. Pat. No. 2,543,181 and Yackel et al, U.S. Pat. No. 3,020,155.

A detailed description of various emulsions in which the polymers can be used can be found in *Product Licensing Index*, publication 9232, December 1971, pages 107 through 110.

The copolymers of the present invention are particularly useful to modify the properties of silver halide emulsion layers having gelatin binders. Dispersions of the photographic silver halide containing addition copolymers containing acrylamidophenol groups, in combination with photographic binding agents, such as gelatin, can be made in a variety of ways. For example, an aqueous gelatin dispersion of the photographic silver halide can be mixed with an aqueous dispersion or solution of the polymer. Alternatively, the photographic silver halide can be precipitated in an aqueous dispersion or solution of the polymer with or without colloid, depending upon the dispersion characteristics of the polymer. In this case, a water-soluble salt, such as silver nitrate, is admixed with a water-soluble halide, such as potassium bromide, in the presence of the mixture. In still another procedure, the photographic silver halide is precipitated in an aqueous gelatin solution and digested in the conventional manner known to the art. After digestion, but prior to coating, there is added to the emulsion an aqueous dispersion of the copolymer containing the acrylamidophenol unit. The bulk of the resulting dispersion can be increased by the addition of more of the polymer and/or natural or synthetic colloids or other binding agents suitable for use in photographic silver halide emulsions. Satisfactory colloids include, for example, gelatin, protein derivatives, e.g., carboxy methylated proteins, colloidal albumin, cellulose derivatives, synthetic resins such as polyvinyl compounds, e.g., polyacrylamide and the like.

The gelatin substitutes described herein can be employed as the binder agent in one or more layers of a photographic silver halide element. However, photographic silver halides are generally precipitated in the presence of binding agents, such as gelatin or other colloids, which exhibit very good peptizing action. Therefore, the photographic silver halide emulsions or layers according to this invention will generally contain some binding agent, such as gelatin, which exhibits this very good peptizing action. Generally, the concentration of the polymers described herein as gelatin substitutes will be in the range of about 20 to about 100 percent, more preferably in the range of about 50 to 80 percent by weight, based on total binding agent (dry weight), employed in any layer of a photographic element. In the preferred case, the remainder of the binding agent is gelatin, because it provides the advantage of allowing the coated layers to be chill-set, instead of heat dried.

In certain preferred embodiments, the polymers of this invention are used in photographic image-transfer film units, such as in image-transfer film units as described, for example, in U.S. Pat. Nos. 2,543,181; 2,983,606; 3,227,550; 3,227,552; 3,415,645; 3,415,644; 3,415,646 and 3,635,707; Canadian Pat. No. 674,082; Belgian Pat. Nos. 757,959 and 757,960, both issued Apr. 23, 1971, and British Pat. Nos. 904,364 and 840,731. The polymers of this invention are generally useful in image-transfer film units which comprise:

(1) a photosensitive element comprising a support having thereon at least one layer containing a silver halide emulsion preferably having associated therewith an image dye-providing material, and more preferably at least three of said layers which contain, respectively, a blue-sensitive silver halide emulsion, a green-sensitive silver halide emulsion and a red-sensitive silver halide emulsion;

(2) an image-receiving layer which can be located on a separate support and superposed on said support containing said silver halide emulsion layers or, preferably, it can be coated on the same support adjacent to the photosensitive silver halide emulsion layers; and (3) an alkaline processing composition and means adapted to discharge said alkaline processing composition within said film unit.

Where the receiver layer is coated on the same support as the photosensitive silver halide layers, the support is preferably a transparent support. An opaque layer is preferably positioned between the image-receiving layer and the photosensitive silver halide layer. The alkaline processing composition preferably contains an opacifying substance, such as carbon or a pH-indicator dye, which is discharged into the film unit between a dimensionally stable support or cover sheet and the photosensitive element.

As mentioned previously, the polymers containing the acrylamidophenol crosslinking group are particularly useful in forming crosslinkable and crosslinked polymers that are sensitive to high pH. This feature makes these polymers particularly useful in various layers in photographic image-transfer film units and in various layers in elements for analyzing blood chemistry. For example, acid layers for neutralizing base may be formed using the acrylamidophenol unit containing polymers of the present invention wherein the acrylamidophenol is polymerized with an acid-providing monomer. Acidic polymers are unstable and ineffective using conventional active methylene groups containing crosslinkable units because the high pH necessary to crosslink the polymer also neutralizes the acid-providing monomer. The present polymers can be crosslinked at low pH, thereby avoiding this problem. Details regarding the use of such a layer for analyzing blood chemistry can be found in commonly assigned copending U.S. Application Ser. No. 880,828, entitled "Method Composition and Element for the Detection of Nitrogen-Containing Compounds" of Figueras et al., filed Feb. 24, 1978, now U.S. Pat. No. 4,176,008.

The following examples are presented for a further understanding of the invention and not to limit its scope in any way.

PREPARATION OF M-METHACRYLAMIDOPHENOL

To a suspension of 47 g (0.43 moles) of m-aminophenol in 100 ml of acetone at 0° to 5° C. was added dropwise a solution of 66.2 g (0.43 moles) of methacrylic anhydride in 150 ml of acetone. After the addition, the reaction was stirred for 0.5 hours at room temperature and was then poured onto ice to precipitate the product. The solid was collected by filtration and recrystallized from 400 ml of 50 percent aqueous ethanol to give 65.6 g of product melting at 171° to 173° C. The yield was 86.6 percent.

EXAMPLE 1

Poly(methyl methacrylate-co-m-methacrylamidophenol) 80:20

To 300 g dimethylformamide (DMF) was added 80.0 g methyl methacrylate and 20 g m-methacrylamidophenol in a 500 ml round-bottom flask equipped with reflux condenser and stirrer. After sparging the solution for 20 minutes with nitrogen at room temperature, the flask was immersed in a 60° C. constant temperature water bath. The solution was sparged with nitrogen for an additional 10 minutes, at which time 0.50 g 2,2'-azobis[2-methylpropionitrile], dissolved in 5 ml DMF, was added. The solution was kept at 60° C. for 22 hours, resulting in a very slightly viscous amber solution. Percent solids=25.25.

A small amount of polymer was isolated by adding the 10 ml polymer solution to 100 ml water, obtaining hard white polymer. The polymer was washed with two 50-ml portions of water, dried for 3 hours at 95° C., and dissolved in 10 ml of acetone. The polymer was reprecipitated in water, washed and dried. $\eta_{inh}$ (DMF)=0.19.

The title polymer was confirmed by elemental analysis.

EXAMPLE 2

Poly(acrylamide-co-1-vinylimidazole-co-m-methacrylamidophenol) 90:05:05

In a 3-liter, 3-neck round bottom flask was added 405 g of water, 69 g of acrylamide and 100 g of acetone containing 3.75 g of 1-vinylimidazole and 3.75 g of m-methacrylamidophenol. The pH of the solution was adjusted from 7.2 to 3.25 with 10 percent $H_2SO_4$ and then 20 g of ethanol was added. The flask containing the hazy solution was placed in a 60° C. constant temperature bath and the solution sparged with nitrogen for 20 minutes. Hydrogen peroxide (1.0 ml, 27.7 percent) was added and the solution remained at 60° C. for 21 hours. The resultant clear, viscous solution was slightly amber. Percent solids=17.25.

The polymer was precipitated in acetone, washed with acetone and dried. $\eta_{inh}$ ($H_2O$)=3.39.

The title polymer was confirmed by elemental analysis.

EXAMPLE 3

Poly[2-acrylamido-2-methylpropane-1-sulfonic acid, sodium salt-co-4'-chloro-3'-[α-(4-methoxycarbonylphenoxy)-α-pivaloylacetamido]acrylanilide-co-m-methacrylamidophenol] 50:45:5

A round-bottom flask was charged with 30.0 g of 2-acrylamido-2-methylpropane-1-sulfonic acid, sodium salt, 27.0 g of 4'-chloro-3'-[α-(4-methoxycarbonylphenoxy-α-pivaloylacetamido]acrylanilide, 3.00 g m-methacrylamidophenol, 0.30 g of 2,2'-azobis(2-methylpropionitrile) and 240 ml of dimethylformamide. The clear pale orange solution which resulted after swirling for a few minutes was immersed in a 60° C. bath and bubbled with high purity nitrogen for 16 minutes. The solution was then stoppered and kept at 60° C. for an additional 6 hours. The resulting viscous, clear, pale red dope was placed in a cellulosic dialysis bag (Union Carbide) and tumbled overnight in a vat of flowing distilled water. Upon freeze-drying the retentate, a fluffy light tan solid was obtained which was found to contain 1.1 percent volatiles.

The title polymer was confirmed by elemental analysis.

EXAMPLE 4

Coating a Polymer of the Invention

A solution of 1.00 g of the polymer of Example 3 in 9 ml of distilled water was brought to pH 6 with a small amount of dilute aqueous sodium hydroxide. It was subsequently treated with 8 drops of a 10 percent solution of bis(vinylsulfonylmethyl) ether in methanol and 11 drops of a 2.5 percent solution of Surfactant 10G (a non-ionic surfactant manufactured by Rohm and Haas) in water. The resulting dope was coated with a 6-mil coating blade onto subbed 4-mil poly(ethylene terephthalate) film base. Upon drying, a clear, non-tacky, smooth coating was obtained.

The coating was found to be effectively crosslinked. It could not be washed off or easily rubbed off in water, and required scraping to remove it from the film base. The scrapings were found to be insoluble in water.

EXAMPLE 5

This is a comparative example.

A copolymer (essentially the same as the copolymer of Example 3, except that it did not contain the m-methacrylamidophenol) poly[2-acrylamido-2-methylpropane-sulfonic acid, sodium salt-co-4'-chloro-3'-[α-(4-methoxycarbonylphenoxy)-α-pivaloylacetamido]-acrylanilide], weight ratio 49:51, failed to crosslink either when coated or examined in the same manner as described in Example 4 or when coated with formaldehyde as the crosslinking agent. The resulting films readily washed off and dissolved in water.

EXAMPLE 6

Poly[2-acrylamido-2-methylpropane-1-sulfonic acid, sodium salt-co-1-(2,4,6-trichlorophenyl)-3-(3-acrylamidobenzamido)-2-pyrazoline-5-one-co-m-acrylamidophenyl] 48:47:5

The title polymer was prepared and examined in essentially the same manner as the title polymer in Example 3. Its behavior on coating and crosslinking was also virtually identical. The polymer was effectively crosslinked, forming a coating which could not be washed off or easily rubbed off in water. Scraping was required to remove the wet coating from the film base. The scrapings were found to be insoluble in water.

EXAMPLE 7

Poly[2-acrylamido-2-methylpropane-1-sulfonic acid, sodium salt-co-1-(2,4,6-trichlorophenyl)-3-(3-acrylamidobenzamido)-2-pyrazoline-5-one-co-p-methacrylamidophenol] 51:44:5

The title polymer was prepared and examined in essentially the same manner as the title polymer in Example 3. Coatings prepared as in Example 4 failed to wash off in water, although they could be removed by vigorous rubbing.

EXAMPLE 8

Poly[2-acrylamido-2-methylpropane-1-sulfonic acid, sodium salt-co-1-(2,4,6-trichlorophenyl)-3-(3-acrylamidobenzamido)-2-pyrazoline-5-one-co-p-acrylamidophenol] 48:47:5

The title polymer was prepared and examined in essentially the same manner as the title polymer in Example 3. Coatings prepared as in Example 4 failed to wash off in water, although they could be removed by vigorous rubbing.

EXAMPLE 9

Poly(acrylic acid-co-m-methacrylamidophenol) 95:5

In a 2-liter flask equipped with stirrer, reflux condenser and nitrogen inlet was added 95 g of acrylic acid in 705 g of distilled water and 5 g of m-methacrylamidophenol in 200 ml of alcohol. The solution was sparged for 20 minutes with nitrogen and 0.5 g of 2,2'-azobis[2-methylpropionitrile], dissolved in 20 ml of acetone, was added. The reaction mixture was brought to 60° C. and remained at that temperature for 17 hours. The resultant polymer solution had a bulk viscosity of 145 cps at 11.1 percent solids.

EXAMPLE 10

Poly(methacrylic acid-co-m-methacrylamidophenol) 80:20

The title polymer was prepared using methacrylic acid according to the procedure of Example 9, except that the weight ratio of acid to phenol was 80:20. The resulting solution of polymer had a bulk viscosity of 486 cps at 11.1 percent solids.

EXAMPLE 11

Crosslinking of Acid Copolymer

A. Acrylic Acid Copolymer

To 1 g of the acrylic acid copolymer of Example 9 in 10 ml $H_2O$ was added 1 percent bis-vinylsulfonylmethyl) ether (BVSME) plus 1 ml of 2.5 percent Surfactant 10G. The pH was 1.5. Coating of this polymer melt on 4-mil gel-subbed poly(ethylene terephthalate) at 6 mil wet thickness resulted in a clear, transparent, smooth film upon drying at 130° F. for 10 minutes. After 3 days at room temperature, the polymer film was insoluble in water.

The experiment was repeated with the pH adjusted to 6 before coating. The results were the same.

B. Methacrylic Acid Copolymer

To 10 ml of a 4.8 percent by weight solution of the methacrylic acid polymer of Example 10 (pH 6) was added 0.02 g of 1 percent BVSME. After coating as in A at 8 mil wet thickness and drying, the film was insoluble in water but soluble in a photographic developer solution (pH 12). It was also insoluble in a photographic fix (about pH 4).

A coating of a 1:1 mixture of the polymer and Type IV gelatin gave a clear continuous film useful in photographic materials.

EXAMPLE 12

Analytical Element for Urea Assay

This example corresponds to Example 2 of the commonly assigned copending U.S. Application Ser. No. 880,828 entitled "Method Composition and Element for the Detection of Nitrogen Containing Compounds" cited earlier. Layer 1 of the element contains a copolymer of the present invention, and this layer is responsible for the relative insensitivity of the element to serum pH, as indicated below.

An analytical element for the analysis of urea was prepared by coating the following solutions and dispersing on a cellulose acetate film support at the following coverage.

| Layer | Component | Coverage |
|---|---|---|
| Layer 1 | Copoly(acrylic acid-co-N-(m-hydroxyphenyl)methacrylamide), 95 weight percent acrylic acid | 10.8 g/m$^2$ |
| | bis(vinylsulfonylmethyl) ether (melt adjusted to pH 6.0 prior to coating) | 0.11 g/m$^2$ |
| Layer 2 | agarose | 5.40 g/m$^2$ |
| | Na$_2$HPO$_4$ | 1.62 g/m$^2$ |
| | citric acid | 1.08 g/m$^2$ |
| | methylenebis(acetoacetic ester) | 3.24 g/m$^2$ |
| | copoly[styrene-co-N-vinylbenzyl-N,N-dimethyl-N-benzylammonium chloride-co-divinylbenzene] | 2.16 g/m$^2$ |
| | octylphenoxy polyethoxy ethanol | 0.13 g/m$^2$ |
| | urease (pH adjusted to 6.0 prior to coating) | 22,680 μ/m$^2$ |
| Layer 3 | poly(n-isopropylacrylamide) | 0.32 g/m$^2$ |
| Layer 4 | cellulose acetate | 6.6 g/m$^2$ |
| | titanium dioxide | 46.0 g/m$^2$ |
| | polyurethane | 1.38 g/m$^2$ |
| | octylphenoxy polyethoxy ethanol | 2.69 g/m$^2$ |

To evaluate the coated element, a series of aqueous standards varying in concentration from 20 to 300 mg/dl of urea and a series of spiked serum standards varying in concentration from 50 to 300 mg/dl of urea were prepared.

The element was spotted with 10 μl drops of the above-described urea solutions and the results monitored in a filter fluorimeter standardized to 250 mv vs. BaSO₄ and held at a temperature of 42° C. Plots of the slope of the straight line portions of the output curves against urea concentration demonostrate excellent linearity up to 100 mg/dl urea with the aqueous standards and good linearity up to 300 mg/dl added urea with the spiked serum.

The coated element was then evaluated for change in response with change in serum pH over a range of 6.7 to 8.4 using spiked serum at 200 mg/dl urea concentration. In terms of slope and in terms of urea concentration read from a calibration curve, there was little change in response with change in serum pH over the given range.

| Serum pH | Slope | Urea Equivalents |
|---|---|---|
| 6.7 | 5.58 | 204 |
| 7.8 | 5.70 | 208 |
| 8.4 | 5.60 | 204 |

The invention has been described in detail with particular reference to certain preferred embodiments thereof, but it will be understood that variations and modifications can be effected within the spirit and scope of the invention.

What is claimed is:

1. A crosslinked addition copolymer formed by crosslinking a copolymer comprising:
   A. from about 0.5 to 50 percent by weight of a unit having the formula

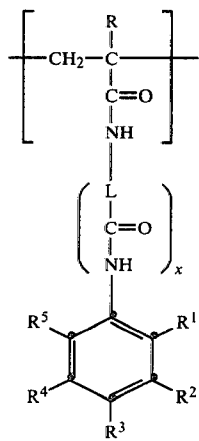

wherein:
   x is 1 or 0,
   R represents hydrogen or methyl,
   L is alkylene and cycloalkylene having from 1 to 6 carbon atoms or arylene having from 6 to 10 carbon atoms, and
   $R^1$ through $R^5$ are independently selected from the group consisting of hydrogen, hydroxy, alkyl from 1 to 6 carbon atoms and aryl from 6 to 10 carbon atoms; with the proviso that at least one of $R^1$ through $R^5$ is hydroxy and at least one of the positions ortho or para to said hydroxy has a hydrogen atom attached thereto; and
   B. from about 50 to 99.5 percent by weight of units of at least one additional polymerized ethylenically unsaturated monomer;

with 0.1 to 25 percent by weight based on the total weight of the uncrosslinked polymer of a gelatin crosslinking agent.

2. A crosslinking addition copolymer of claim 1 wherein said crosslinking agent is an aldehyde or an organic compound having at least two activated double bonds.

3. A crosslinked addition copolymer of claim 1 wherein said crosslinking agent is selected from the group consisting of formaldehyde and bis(vinylsulfonylmethyl) ether.

4. A crosslinked addition copolymer of claim 1 wherein said crosslinking copolymer is crosslinked with 0.1 to 10 percent by weight of said crosslinking agent based on the total weight of the uncrosslinked polymer.

5. A crosslinked addition copolymer of claim 1 wherein B is a polymerized monomer which hydrolyzes at high pH.

6. A crosslinked addition copolymer of claim 1 wherein $R^2$ or $R^4$ is hydroxy and $R^3$ is hydrogen.

7. A crosslinked addition copolymer of claim 1 wherein A comprises about 0.1 to 20 weight percent of the copolymer.

8. A crosslinked addition copolymer of claim 1 wherein A is polymerized m-acrylamidophenol.

9. A crosslinked addition copolymer of claim 1 wherein B is polymerized acrylic acid or polymerized methacrylic acid.

10. A process of crosslinking a copolymer comprising:
    A. from about 0.5 to 50 percent by weight of a unit having the formula:

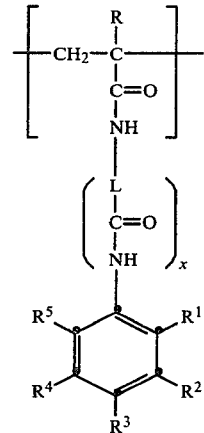

wherein:
   x is 1 or 0,
   R represents hydrogen or methyl,
   L is alkylene and cycloalkylene having from 1 to 6 carbon atoms or arylene having from 6 to 10 carbon atoms, and
   $R^1$ through $R^5$ are independently selected from the group consisting of hydrogen, hydroxy, alkyl from 1 to 6 carbon atoms and aryl from 6 to 10 carbon atoms; with the proviso that at least one of $R^1$ through $R^5$ is hydroxy and at least one of the positions ortho or para to said hydroxy has a hydrogen atom attached thereto; and
   B. from about 50 to 99.5 percent by weight of units of at least one additional polymerized ethylenically unsaturated monomer;

comprising adding a gelatin crosslinking agent to said copolymer wherein said crosslinking agent comprises from 0.1 to 25 percent by weight based on the total weight of the uncrosslinked polymer.

* * * * *